Nov. 25, 1947.　　　L. P. CRONVALL　　　2,431,312
BATTERY CHARGING CONTROL SYSTEM
Filed Dec. 6, 1944
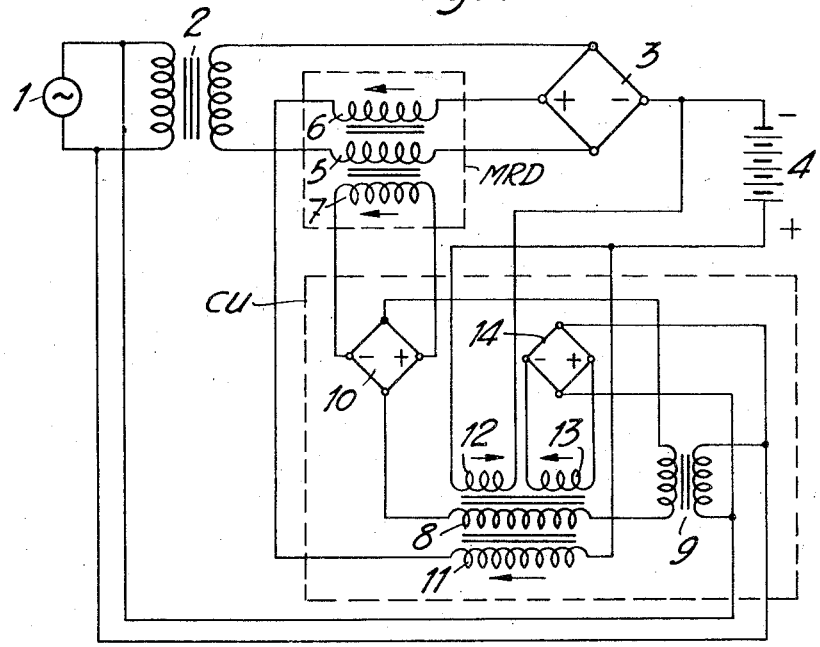
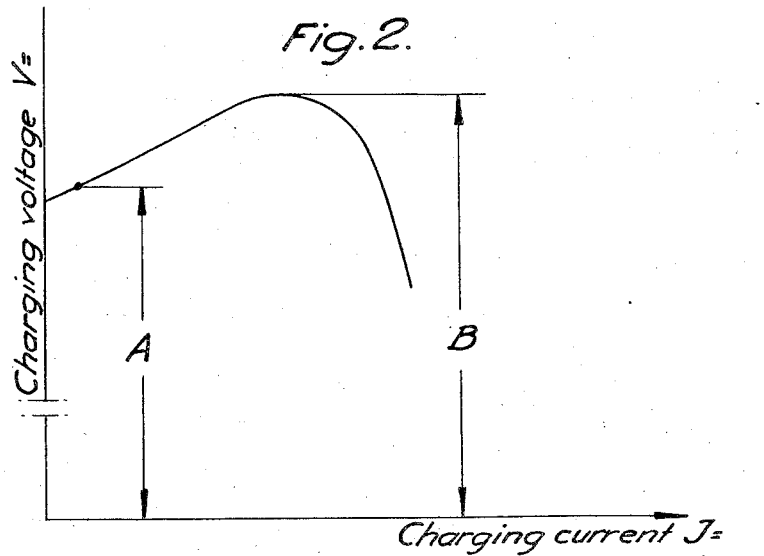
Inventor
Lars Per Cronvall Patented Nov. 25, 1947

2,431,312

UNITED STATES PATENT OFFICE 2,431,312

BATTERY CHARGING CONTROL SYSTEM

Lars Per Cronvall, Stockholm, Sweden, assignor to International Standard Electric Corporation, New York, N. Y.

Application December 6, 1944, Serial No. 566,888
In Sweden December 22, 1943

8 Claims. (Cl. 320—22)

This invention relates to systems for charging accumulator batteries from A. C. supplies over rectifiers.

The main object of the invention is to provide an improved charging control for such systems capable of performing its operation without the aid of relays or movable elements at all.

With this and other objects in view the invention consists in the novel combination and arrangement of elements hereinafter fully described, illustrated on the accompanying drawing and pointed out in the claims hereunto appended.

On said drawing:

Fig. 1 is a circuit diagram of a preferred embodiment of my invention.

Fig. 2 shows a characteristic curve representing the general relation of D. C. charging voltage to D. C. charging current for the system illustrated in Fig. 1.

With reference to Fig. 1, I represents an A. C. supply, 2 a transformer for deriving A. C. therefrom and applying it to a dry rectifier 3 for the purpose of charging battery 4.

For controlling the charging there is provided a main reactor device MRD comprising a saturable core choke coil 5 traversed by the alternating current and two D. C. exciting windings 6 and 7. Winding 6 is traversed by the battery charging current whereas the direct current for winding 7 is supplied by a control unit CU.

As shown said control unit in the embodiment illustrated comprises an auxiliary or regulation reactor device having a saturable core choke coil or winding 8 traversed by alternating current derived from supply 1 over transformer 9 and rectified by rectifier 10 the output of which is applied to D. C. winding 7 of the main reactor device MRD.

In addition the auxiliary reactor device comprises three D. C. exciting windings 11, 12 and 13 the first of which is traversed by the battery charging current whereas the second passes a current dependent on the battery charging voltage and the third receives D. C. from a rectifier 14 supplied with A. C. from the input of transformer 9.

The mode of operation is as follows:

When connecting a discharged accumulator, such as 4, for instance, a lead accumulator having a voltage of about 2 volts per cell, to rectifier 3 full charging current is obtained in the moment of connection, said charging current passing through windings 6 and 11. Consequently the impedance of winding 8 presents its minimum value resulting in a maximum D. C. voltage applied to rectifier 10. Thus the current through winding 7 has its maximum value in response to which winding 5 presents its minimum impedance (full saturation). Thus the maximum current passes through winding 5 resulting in the maximum rectified charging current referred to and flowing through windings 6 and 11 as well as through battery 4.

When the counter E. M. F. of battery 4 in the beginning of the charging increases the charging current decreases slightly the decrease being substantially dependent on the increased resistance of the circuit 2—5—3—4.

When the counter E. M. F. of battery increases further the charging current through windings 6 and 11 decreases. The auxiliary reactor is so constructed and proportioned that the core associated with winding 8 during the initial charging operation remains saturated. Consequently the maximum current still flows through winding 7. On the other hand, the impedance of choke coil 5 increases in response to the decrease of the current through winding 6. Consequently the current voltage characteristic will bend as shown in Fig. 2.

When the voltage of battery 4 approaches the value B at which the battery is full-charged (approximately 2.5 volts per cell) the charging current has decreased to a predetermined value and when the counter E. M. F. of the accumulator and thereby the charging current in the continued charging decreases further somewhat then the impedance of choke coil 8 increases and the current through winding 7 of the main reactor decreases. Consequently the impedance of choke coil 5 increases whereby the charging current through windings 6 and 11 decreases and the impedance of choke coil 5 increases still further. This operation then continues until a condition of equilibrium is attained when the voltage of the battery reaches a value A corresponding to about 2.15 volts per cell at which only the maintenance current flows through the system.

By providing the auxiliary reactor with winding 12 aiding winding 11 the operation above described will be still more accentuated in that the impedance of winding 8 is reduced at the greatest rate when the voltage of the battery has its maximum value.

Winding 13 above referred to has for its object to compensate for fluctuations of the supply voltage and opposes windings 11 and 12. Thus when the supply voltage for any reason increases the charging current will tend to increase. This tendency is counteracted by the simultaneous increase of the current through winding 13 whereby the total excitation of the auxiliary reactor decreases, the impedance of winding 8 increases and the current through winding 7 decreases. Thus the impedance of choke coil 5 increases resulting in a decrease of the charging current which thereby is restored to its original value.

By varying the dependence of the control unit CU (which operates as a source of excitation for the main reactor) on the charging current and voltage applied thereto the values of A and B as well as the slope of the left-hand part of the characteristic shown in Fig. 2 may be varied at will. Besides the feeding of the control unit from the supply I obviously is of importance for preventing a distortion of the current voltage characteristic due to unavoidable variations of the voltage of the supply.

Obviously the invention is not restricted to the arrangements described in the foregoing and illustrated on the drawing but is susceptible of many changes and the right is herein reserved to make such changes as properly fall within the scope of the appended claims.

What I claim is:

1. A battery charging system comprising a source of alternating current, circuit means including a rectifier and a first reactor means having at least two windings for supplying charging energy to a battery, control means for controlling the impedance of said first reactor means, said control means including a second reactor means serially connected in said circuit means responsive to the charging current in said circuit means to lower the impedance of the first reactor means to a minimum upon initiation of a high charging current, and upon reduction of the charging current below a predetermined value, to increase the impedance of said first reactor means, said control means further comprising a reactor element associated with said second reactor means connected across the battery being charged.

2. A battery charging system comprising a source of alternating current, circuit means including a rectifier and a first reactor means having at least two windings for supplying charging energy to a battery, control means for controlling the impedance of said first reactor means, said control means including a second reactor means serially connected in said circuit means responsive to the charging current in said circuit means to lower the impedance of the first reactor means to a minimum upon initiation of a high charging current, and upon reduction of the charging current below a predetermined value to increase the impedance of said first reactor means, said control means further comprising a reactor connected to said source of alternating current for supplying energy to said reactor element to provide a balancing influence on said second reactor means.

3. A battery charging system according to claim 1 further comprising a second reactor element associated with said second reactor means and an associated rectifier for supplying energy to said second reactor element connected to said source of alternating current.

4. A battery charging system comprising a source of alternating current, circuit means including a rectifier and reactor means having at least two windings for supplying charging energy to a battery, control means for controlling the impedance of at least one of said windings, said control means including a reactor winding connected to said source of alternating current, a rectifier connected to said reactor winding, means connecting the output of such rectifier to the other of said windings, and means to control the impedance of said reactor winding to lower the impedance thereof to a minimum upon initiation of a high charging current, and upon reduction of the charging current below a predetermined value, to increase the impedance of said reactor winding.

5. A battery charging system comprising a source of alternating current, reactor means comprising first, second and third windings, rectifier means connected to the first and second windings and to said source of current for supplying charging energy to a battery to be charged, control means for controlling flow of current through said third winding, said control means including a rectifier connected to said third winding, a reactor winding, a means connecting said reactor winding to said rectifier and said source of current, and means included in circuit with said first winding and said battery to control the impedance of said reactor winding, whereby high initial charging current reduces the impedance of the reactor winding to a minimum thereby permitting a maximum flow of current therethrough to said third winding, and the high current in said third winding reduces the impedance of said second winding to a minimum to permit a high charging voltage, and upon reduction of the charging current in said first winding below a predetermined value, an increase in the impedance of said reactor means is caused, thereby reducing the current flow in said third winding and causing a reduction in the charging voltage.

6. A battery charging system according to claim 5 wherein said control means includes a reactor element associated with said reactor winding and connected across the battery being charged.

7. A battery charging system according to claim 5 wherein said control means includes a reactor element, associated with said reactor winding, and rectifier means connected to said source of alternating current to provide a balancing influence on said reactor winding.

8. A battery charging system according to claim 5 wherein said control means includes a reactor element associated with said reactor winding and connected across the battery being charged, and a second reactor element also associated with said reactor winding and rectifier means connecting said second reactor element to said source of alternating current.

LARS PER CRONVALL.

REFERENCES CITED

The following references are of record in the file of this patent:

UNITED STATES PATENTS

| Number | Name | Date |
| --- | --- | --- |
| 1,916,307 | Gilson | July 4, 1933 |
| 1,995,637 | Day | Mar. 26, 1935 |
| 1,995,652 | Reichard | Mar. 26, 1935 |
| 2,029,628 | Lord | Feb. 4, 1936 |
| 2,082,607 | Amsden | June 1, 1937 |
| 2,085,061 | Aggers | June 29, 1937 |
| 2,114,827 | Aggers | Apr. 19, 1938 |
| 2,179,299 | Murcek | Nov. 7, 1939 |
| 2,306,998 | Claesson | Dec. 29, 1942 |
| 2,155,515 | Trucksess | Apr. 25, 1939 |
| 2,334,528 | Amsden | Nov. 16, 1943 |
| 2,346,997 | Priest | Apr. 18, 1944 |
| 2,373,383 | Christopher | Apr. 10, 1945 |

FOREIGN PATENTS

| Number | Country | Date |
| --- | --- | --- |
| 555,702 | Great Britain | Sept. 3, 1943 |